A. LEVETT.

BUFFING OR POLISHING WHEEL.

APPLICATION FILED MAR. 24, 1921.

Reissued Nov. 15, 1921.

15,226.

2 SHEETS—SHEET 1.

Alexander Levett

INVENTOR

BY W. J. Whitney

ATTORNEY

A. LEVETT.

BUFFING OR POLISHING WHEEL.

APPLICATION FILED MAR. 24, 1921.

Reissued Nov. 15, 1921.

15,226.

2 SHEETS—SHEET 2.

Alexander Levett INVENTOR

BY W. B. Whitney

ATTORNEY

UNITED STATES PATENT OFFICE.

ALEXANDER LEVETT, OF NEW YORK, N. Y., ASSIGNOR TO BENJAMIN D. RIEGEL, TRUSTEE, OF FAIRFIELD, CONNECTICUT.

BUFFING OR POLISHING WHEEL.

15,226. Specification of Reissued Letters Patent. Reissued Nov. 15, 1921.

Original No. 1,296,522, dated March 25, 1919, Serial No. 249,846, filed August 14, 1918. Application for reissue filed March 24, 1921. Serial No. 455,145.

*To all whom it may concern:*

Be it known that I, ALEXANDER LEVETT, a citizen of the United States, and a resident of the city of New York, borough of Manhattan, in the county and State of New York, have invented a new and Improved Buffing or Polishing Wheel, of which the following is a full, clear, and exact description.

The invention relates to buffing or polishing wheels made of cotton, wool, leather or other material, and its object is to provide a new and improved buffing or polishing wheel arranged to prevent the loss of the material of which the wheel is made and to permit of using the wheel until the material is worn away, practically down to the hub or center piece. Another object is to provide a buffing or polishing wheel which is exceedingly strong and durable and which can be cheaply and quickly manufactured with a minimum amount of material.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

In the manufacture of buffing or polishing wheels of woven fabric strips as heretofore practised, it has been customary to superimpose such strips and to fasten the same together by stitches a distance from the marginal edge of a strip. Now as the wheel wears down to the row of stitches the remaining marginal portion of the strip becomes detached and flies off the rotating wheel by the centrifugal force and hence such material is not utilized for buffing or polishing purposes and is lost. In my invention presently to be described in detail the strip of material is doubled up widthwise and gathered along the doubled up or median edge, and this strip is wound on the hub or center of the wheel to permit of using the strip up to the gathered edge, that is, to the center or hub of the wheel, and very little material is lost.

Figure 1:
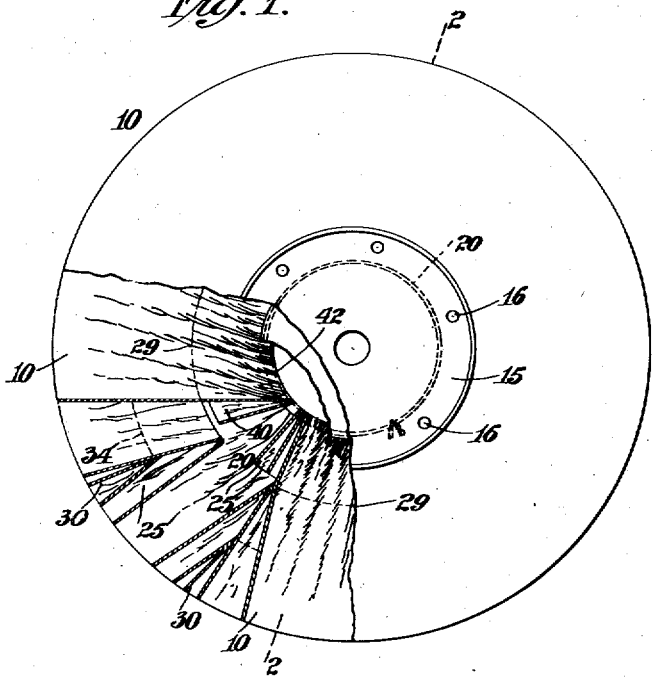
Figure 1 is a face view of the buffing or polishing wheel with parts broken out.
Figure 2:
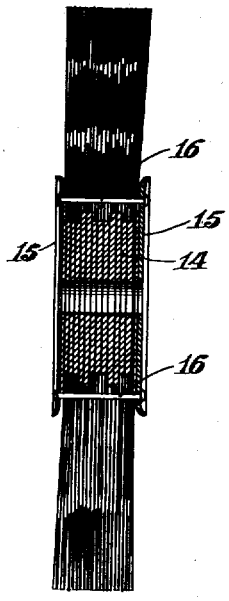
Fig. 2 is a cross section of the same on the line 2—2 of Fig. 1.
Figure 6:
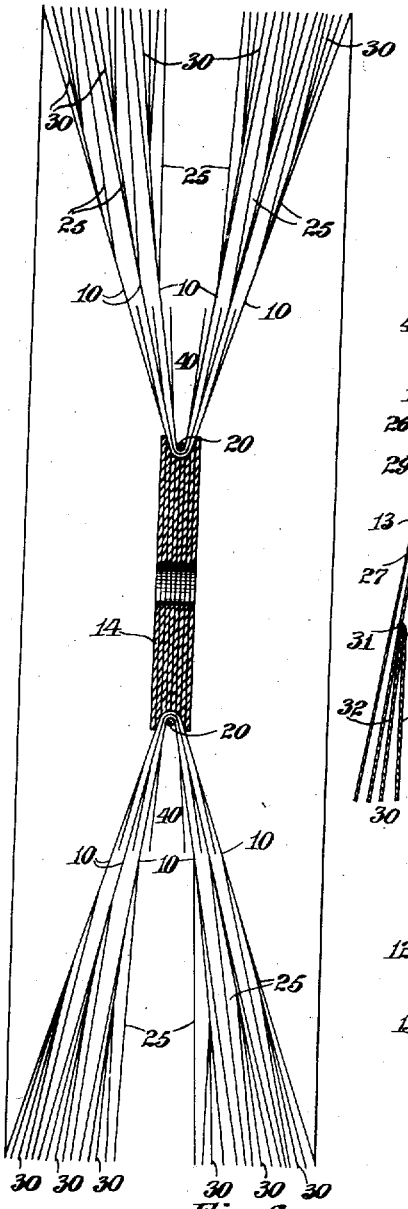
Fig. 6 is an enlarged cross section of one of the units for forming the buffing or polishing wheel.
Figure 5:
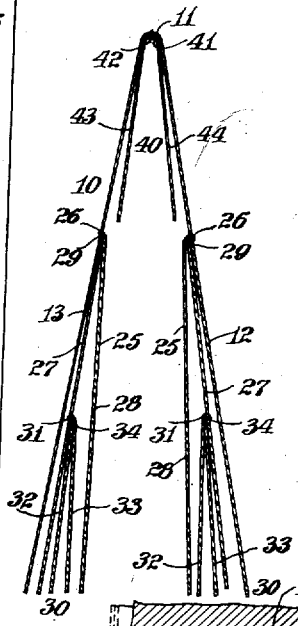
Fig. 5 is an enlarged cross section of the strip after being doubled up.
Figure 7:
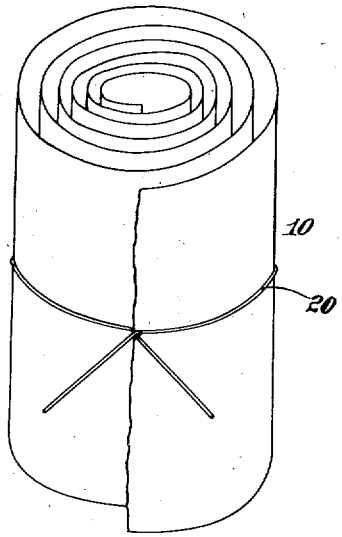
Fig. 7 is a perspective view of the strip wound up to form superimposed layers prior to doubling up the strip and gathering the same along the doubled up or median line.
Figure 8:
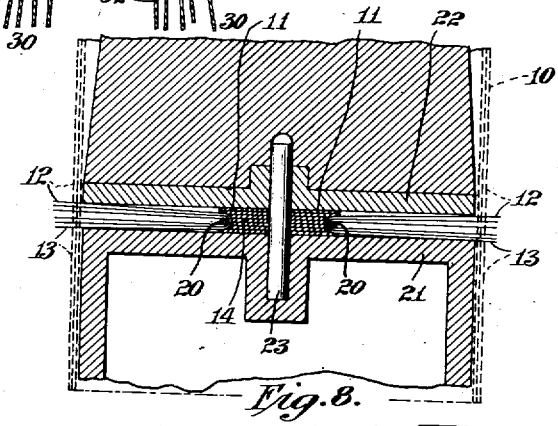
Fig. 8 is a cross section of a unit formed of a single strip of doubled up and gathered material and the apparatus for forming the unit.

In its simplest form, a strip 10 of cloth or other suitable material is doubled up widthwise to provide a median line or edge 11 and members 12 and 13, the outer edges of which form the peripheral face of the wheel. The gathered edge 11 is wound around a core or disk 14. By the arrangement described a unit is formed and any number of such units may be placed together, one alongside the other as shown in Fig. 2, for making a buffing or polishing wheel of a desired width. The opposite faces of the body are covered by disks 15 connected with each other by rivets, bolts or other suitable fastening means 16, not necessarily extending through the material of which the body is formed. In practice, the strip 10 is held in doubled up and gathered position around the core 14 in a number of superimposed layers by the use of a string 20 tied around the outermost layer, as plainly indicated in Figs. 6, 7, and 8. In practice, the unit is formed on an apparatus such as shown and described in my application for Letters Patent of the United States, No. 233,757, filed by me on May 10, 1918. In the apparatus shown in Fig. 8, the core 14 is held between two disks 21 and 22 with an axle 23 extending centrally through the core and held in the disks 21, 22. The material is wound around the disks 20 and 21 once or a number of times and with the middle of the material at the groove formed between the disks. The string or cord 20 is now placed around the material opposite the groove and drawn tight to draw the material into the groove and with the edge 11 against the peripheral face of the core 14 thereby gathering the material and doubling up the layers to form the members 12 and 13, as plainly indicated in Fig. 8. The core 14 is preferably built up of a number of superimposed disks of pasteboard or like material according to the thickness of the unit body formed by the members 12 and 13 and which latter correspond each to the number of windings given the material around the disks 21 and 22. The strip 10 is preferably cut bias fashion from a piece of material so that the outer edges of the members 12 and 13 do not ravel thus insuring the proper use of the buffing or polishing wheel without any waste of material.

In order to give more fullness to the buffing or polishing wheel, the main strip 10 is provided with two intermediate strips of material 25 each doubled up widthwise to provide a median line or edge 26 and members 27 and 28. The strips 25 are fastened along their median lines 26 by stitches 29 to the members 12 and 13 of the main or carrying strip 10 and at a point a distance from the median line 11 of the main or carrying strip 10. To the member 27 of each intermediate strip 25 is secured an outer doubled up strip 30 of material similar to that of which the main strip 10 and the intermediate strips 25 are made, and this outer strip has a median line 31 and two members 32 and 33. Each strip 30 is fastened along its median line 31 by stitches 34 to the member 27 of the corresponding intermediate strip 25 a distance intermediate the outer and inner edges of the said member 27, as will be readily understood by reference to Figs. 1, 3, 4, 5 and 6. The outer edges of the several members 12, 13, 27, 28, 32 and 33 are disposed in the same plane and form the peripheral edge of the buffing or polishing wheel. It will be noticed that the main or carrying strip 10 is wider than the strips 25 and the latter are wider than the strips 30, and the strips 25 and 30 are arranged between the members 12 and 13 of the outer or carrying strip 10. By the arrangement described a body is formed of a series of strips providing superimposed layers, each strip being doubled up widthwise along the median line of the strip thus providing each strip with two members of practically equal width.

The main strip 10 is further provided with a filling strip 40 doubled up widthwise and fastened along its median line 41 by stitches 42 to the doubled up edge 11 of the main or carrying strip 10, as plainly shown in Figs. 1, 3, 4, 5 and 6. This doubled up filling strip 40 provides two members 43 and 44, the outer edges of which terminate adjacent the median lines 26 of the intermediate strips 25.

Figure 3:
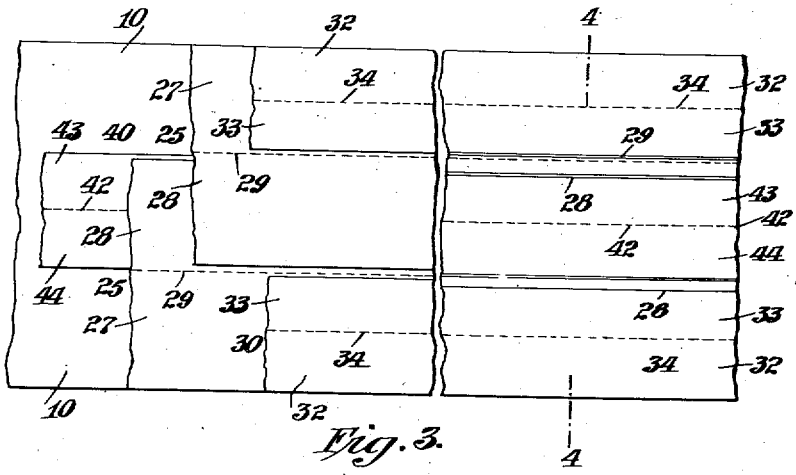
Fig. 3 is a face view of the strip of material in extended position and prior to being gathered and wound around the hub or center of the wheel.
Figure 4:
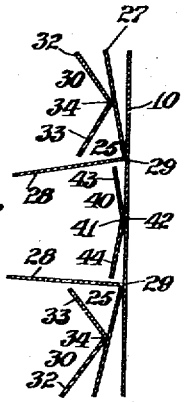
Fig. 4 is a cross section of the same on the line 4—4 of Fig. 3.

In practice, the strips 10, 25, 30 and 40 are sewed together in open width, as plainly shown in Fig. 3, and the median line 11 of the main or carrying strip 10 is gathered either by the stitches 42 or by the insertion of a cord or string 20 at the median line 41.

It will be noticed that when the buffing or polishing wheel is in use and its peripheral edge is gradually worn down until the stitches 34 are reached then the outer strips 30 have been completely used without any loss of material. When the wheel is further worn down to the stitches 29 then the strips 25 have been used up without loss of material and the wheel can be practically worn down to the hub or center of the wheel.

It will further be noticed that by doubling up the strips and fastening the same together along the median line an exceedingly large number of layers of material are provided in the body 10 of the wheel.

It is understood that in each unit the strip is wound around the hub or center at least once but in practice the strip is wound around a number of times to form superimposed layers doubled up widthwise and gathered at the doubled up edge, as above explained and illustrated in the drawings.

It is further understood that I do not limit myself to any particular material of which the strips are made, as cotton, wool, or other material may be used.

It is further understood that I do not limit myself to the number of doubled up auxiliary strips of fabric material shown and described, as the same may be increased or entirely eliminated without deviating from the spirit of my invention.

Having thus described my invention, I claim as new and desire to secure by Letters Patent:—

1. A buffing or polishing wheel comprising a hub and a body, the body being made of a helically wound strip of material doubled up widthwise and having its median line gathered and wound around the said hub, the outer raw edge of the strip forming the peripheral face of the wheel.

2. A buffing or polishing wheel, comprising a hub and body, the latter being made of a helically wound strip of bias cut material doubled up widthwise and having its median line gathered and wound around the said hub, the outer raw edge of the strip forming the peripheral face of the wheel.

3. A buffing or polishing wheel, comprising a hub and a body, the latter being made of a strip of material wound around the hub to form superimposed layers, the strip being doubled up widthwise and having its median line gathered and wound around the said hub, the outer raw edges of the layers forming the peripheral face of the wheel.

4. A buffing and polishing wheel having a body, comprising a main strip of material gathered around the hub of the wheel, and auxiliary doubled up strips of less width than the said main strip and each fastened along its median line to a member of the main strip a distance from the doubled up edge thereof.

5. A buffing and polishing wheel having a body made of a material gathered around the hub or center of the wheel, the said body comprising a main strip, intermediate strips of less width than the said main strip, and outer strips of less width than the said intermediate strips, each strip being doubled widthwise along its median line, the said main carrying strip having its doubled up edge gathered and providing two members each of which has attached thereto a doubled up intermediate strip, each doubled up intermediate strip having two members one of which has attached thereto a doubled up outer strip, the edges of the several strips forming the peripheral face of the wheel.

6. A buffing or polishing wheel, comprising a hub and a body, the latter being made of a strip of material wound to form superimposed layers, the layers being doubled up widthwise of the strip and the doubled up portions of the layers being gathered and wound around the said hub, the outer raw edges of the said layers forming the peripheral face of the wheel.

7. A buffing or polishing wheel made of a continuous strip of material wound around a hub to form a plurality of superimposed layers, the strip being doubled up widthwise, the outer edges of the strip forming the peripheral face of the wheel, and fastening means fastening the layers together along the median lines of the layers.

8. A buffing or polishing wheel, comprising a series of units arranged one alongside the other and each having a core and a body made of a strip of material doubled up widthwise and having its median edge gathered and wound around the said core, flanges on the outer faces of the outermost units, and fastening means connecting the flanges with each other.

9. A buffing or polishing wheel comprising a plurality of superimposed layers of textile material which are secured together without the formation of pockets and the threads of which, both warp and woof, are throughout oblique to the radii and their raw outer ends form the peripheral face of the wheel.

10. A buffing or polishing wheel, comprising a plurality of superimposed layers of textile material, which is made of a strip of bias cut material doubled up widthwise and gathered along its folded median line to form a central opening and with both warp and woof threads oblique to the radii of the wheel.

11. A buffing or polishing wheel comprising a plurality of superimposed layers of textile material and in which the material for each layer, cut on the bias and doubled up widthwise, is gathered on its folded median line to form a central opening and its threads both warp and woof are throughout oblique to the radii of the wheel.

ALEXANDER LEVETT.